June 16, 1931.   H. Z. COBB   1,809,830
CONVEYER
Filed May 1, 1929
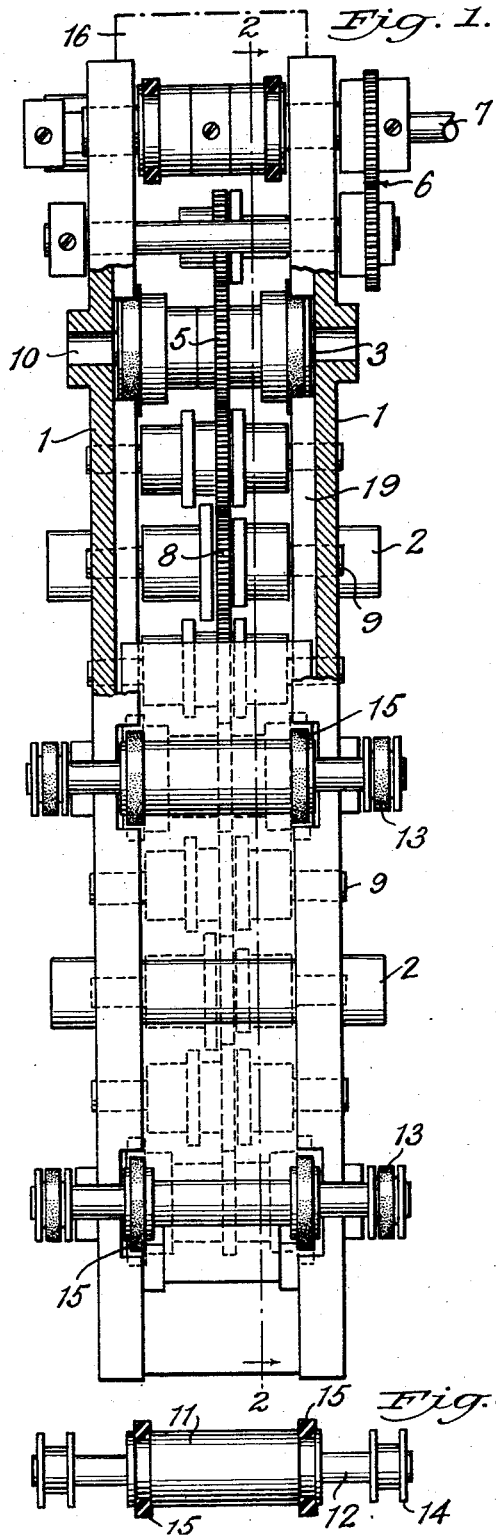
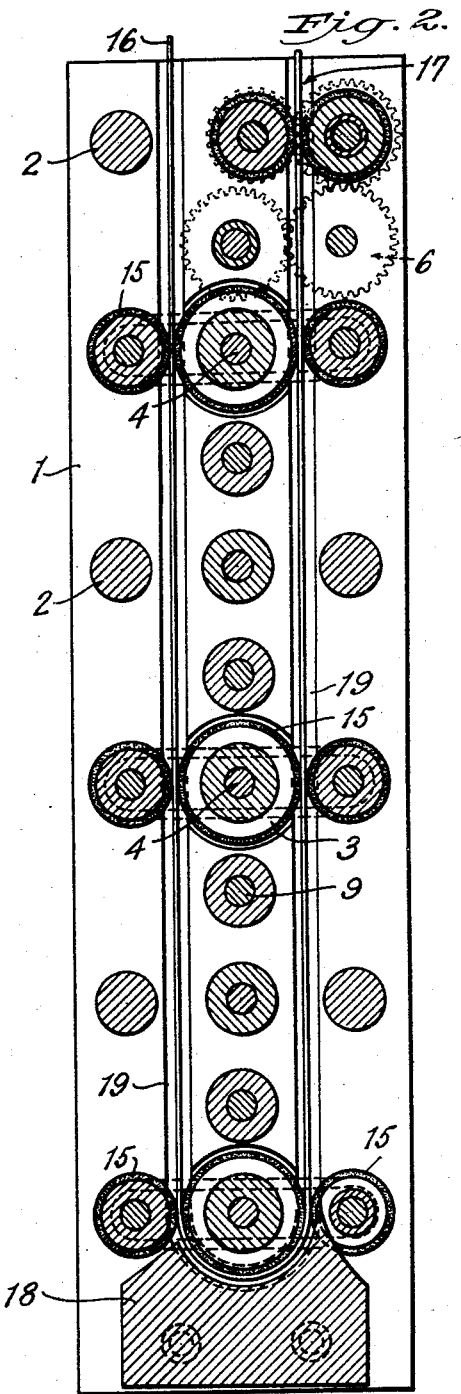
INVENTOR
Henry Z. Cobb
BY
ATTORNEY Patented June 16, 1931

1,809,830

UNITED STATES PATENT OFFICE

HENRY Z. COBB, OF PROVIDENCE, RHODE ISLAND, ASSIGNOR TO REVERE RUBBER COMPANY, OF CHELSEA, MASSACHUSETTS, A CORPORATION OF RHODE ISLAND

CONVEYER

Application filed May 1, 1929. Serial No. 359,444.

This invention relates to a device for moving or conveying photographic films.

In the art of photography, one of the types of mechanism for photographing involves a machine for making a series of photographs at a very low cost, the mechanism for making and developing the photographs being largely automatic. In this type of photographic machine the pictures are made on a strip of photographic film. The photographic film is then passed successively through a series of tanks containing the proper developing and washing solutions. In order to convey the photographic film through these solutions, a largely automatic mechanism is required, and heretofore such mechanism as has been employed for this purpose has had the objection that the conveying members employed contacted with a large part or all of the face of the film and tended to blur the same because of such contact.

It is the object of this invention to provide a novel conveyer for moving photographic films through developing solutions in which the moving members which operate to move the photographic films contact only with the marginal portion of the film thereby obviating any danger of marring the surface of the film and at the same time providing sufficient traction to move the film in a satisfactory manner. Other objects and advantages of the present invention will appear from the following detailed description taken in connection with the accompanying drawings, in which:

Fig. 1 is an elevation partly in section of a conveyer embodying this invention.

Fig. 2 is a section taken on line 2—2 of Fig. 1, and

Fig. 3 is a detail view showing one of the rollers which constitute the moving elements of the conveyer.

The conveyer consists of a frame made up of side elements 1—1 which are rigidly held in spaced relation by the cross rods 2 disposed at various points along the length of the side members. These elements are preferably made of hard rubber.

A series of rotatable members such as hard rubber rollers 3 are disposed along the length of the frame and are carried upon shafts 4 rotatably mounted in the frame. Spur gears 5 are mounted upon the shafts 4 whereby the rotatable members may be driven in rotation from the gearing system 6 which derives its motion from any suitable source of power acting through the shaft 7. Intermediate gears 8 for forming driving connections between the various rollers 3 are mounted upon shafts 9 suitably journaled in the side members 1 of the frame.

The side members 1 of the frame are provided with slots 10 extending from the outer edge thereof for a short distance inwardly, the various slots being in line with the shafts 4 of the rollers 3. Spools 11 carried on shafts 12 are mounted for rotation in the slots 10 and are urged towards the rollers 3 by means of elastic belts 13 which extend over pulleys 14 mounted upon the ends of shafts 12. The rollers 3 and the spools 11 are provided with rubber tires 15 which take the form of an elastic washer mounted in suitable grooves in the rollers and spools. These rubber tires 15 are laterally spaced apart a sufficient distance as to contact with the margin of the photographic film passing through the conveyer.

In the operation of the device a photographic film such as shown at 16 is introduced into the conveyer preferably at the point 17 (Fig. 2) and upon motion of the driving mechanism the rubber tires upon the rollers and spools grip the margins of the photographic film and move the same through the conveyer. The elastic belts 13 press the rubber tires of the spools into intimate contact with the film and at the same time press the film into intimate contact with the elastic tires of the rollers 4 so that a non-slipping grip between the film of the rubber tires is obtained. A block 18 is positioned at the bottom of the conveyer and provided with a curved face which acts to direct the end of the film around the bottom roller and to cause the film to be returned in the reverse direction past the opposite sides of the rollers 3. Grooves 19 are provided in the side members 1 through which the film passes and which serve to guide the film and maintain it in properly spaced relation with respect to the rollers 4 and the spools 11.

Insofar as possible all of the various elements of the machine described are made of rubber so that the reagents used in developing the photographic film cannot attack the same, such metal parts as are used being covered with rubber insofar as possible. The use of rubber in the rubber tires is advantageous inasmuch as the rubber will grip a surface of the film even though it is wet.

While rubber tires have been mentioned as the most desirable form of gripping means, other materials than rubber may be made satisfactorily and the form of the tire itself may be varied as by employing studs of rubber or other similar materials about the periphery of rollers, the kind of material and the form of the tire being limited only by the requirements that they provide a sufficient traction upon the surface of the photographic film and only at the margin of the film. The means for pressing the rubber tires on the spools into intimate contact with the photographic film may be varied such as by substituting endless spiral springs for the rubber belts 13 or by providing any suitable form of stationary type of spring for thrusting the spools inwardly toward the driven rollers. Other types of driving mechanism than that herein shown may be used, as will be obvious to one skilled in the art, and all of the modifications herein suggested as well as others which will occur to one skilled in the art are contemplated as part of the present invention, insofar as they are included within the scope of the following claims.

Having thus described my invention, what I claim and desire to protect by Letters Patent is:

1. A conveyer for photographic films and the like comprising a frame, a series of driving members rotatably mounted in the frame, driven members mounted for rotation in the frame, there being driven members on opposite sides of each of the driving members, means on each of the members for gripping the margins of a film, and mechanism for operating the driving members.

2. A conveyer for photographic films comprising a frame, a series of driving members rotatably mounted in the frame, driven members mounted for rotation in the frame, there being driven members on opposite sides of each of the driving members, rubber tires mounted in spaced relation on each of the members, tires on adjacent members being arranged to grip opposite sides of the margin of a film, and mechanism for operating the driving members.

3. A conveyer for photographic films comprising a frame, a series of driving members rotatably mounted in the frame, driven members mounted for rotation in the frame, there being driven members on opposite sides of each of the driving members, rubber tires mounted in spaced relation on each of the members, the tires on adjacent members being arranged to grip opposite sides of the margin of a film, resilient means to press the driving members into intimate contact with the film, and mechanism for operating the driving members.

Signed at Providence, county of Providence, State of Rhode Island, this 27th day of April, 1929.

HENRY Z. COBB.